United States Patent
Azevedo et al.

(10) Patent No.: US 7,409,600 B2
(45) Date of Patent: Aug. 5, 2008

(54) SELF-HEALING CACHE SYSTEM

(75) Inventors: Michael J. Azevedo, San Jose, CA (US);
Carol Spanel, San Jose, CA (US);
Andrew D. Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 717 days.

(21) Appl. No.: 10/889,380

(22) Filed: Jul. 12, 2004

(65) Prior Publication Data

US 2006/0010354 A1    Jan. 12, 2006

(51) Int. Cl.
*G06F 11/00* (2006.01)
(52) U.S. Cl. ............................. 714/42; 714/5; 711/113; 711/118
(58) Field of Classification Search .................. 714/42, 714/5, 6, 54; 711/113, 100
See application file for complete search history.

(56) References Cited

U.S. PATENT DOCUMENTS

| | | | |
|---|---|---|---|
| 4,740,889 A | | 4/1988 | Motersole et al. |
| 6,006,311 A | * | 12/1999 | Arimilli et al. ............. 711/133 |
| 6,061,731 A | | 5/2000 | Blakeslee |
| 6,389,509 B1 | | 5/2002 | Berenguel et al. |
| 6,412,051 B1 | * | 6/2002 | Konigsburg et al. ......... 711/163 |
| 6,418,068 B1 | * | 7/2002 | Raynham .................... 365/200 |
| 6,516,429 B1 | | 2/2003 | Bossen et al. |
| 6,922,798 B2 | * | 7/2005 | Nemani et al. .............. 714/710 |
| 2002/0133504 A1 | * | 9/2002 | Vlahos et al. ............ 707/104.1 |
| 2003/0023932 A1 | | 1/2003 | Arndt et al. |
| 2005/0257083 A1 | * | 11/2005 | Cousins ........................ 714/6 |

FOREIGN PATENT DOCUMENTS

| | | |
|---|---|---|
| JP | 59207098 | 11/1984 |
| JP | 62236052 | 10/1987 |
| JP | 4171550 | 6/1992 |
| JP | 5274223 | 10/1993 |
| JP | 6259324 | 9/1994 |
| JP | 10254785 | 9/1998 |

OTHER PUBLICATIONS

R.S. Crouse, et al., "Self-Healing RAM Management Algorithm," IBM Technical Disclosure Bulletin, vol. 27, No. 5, Oct. 1984, pp. 2762-2763.
L. Liu, "Cache Invalidate Filtering with Residence Approximation," IBM Technical Disclosure Bulletin, vol. 36, No. 07, Jul. 1993, pp. 2221-2224.

* cited by examiner

*Primary Examiner*—Dieu-Minh Le
(74) *Attorney, Agent, or Firm*—William K. Konrad; Konrad Raynes & Victor LLP

(57) ABSTRACT

A method, apparatus and program storage device for performing a self-healing cache process is described. At least one error affecting a cache is detected. The cache may have a matching address tag for a fetching operation. Based on the type of error, a self-healing cache process is performed based.

30 Claims, 9 Drawing Sheets

SELF-HEALING CACHE SYSTEM

BACKGROUND OF THE INVENTION

1. Field of the Invention

This invention relates in general to cache operations and more particularly to a method, apparatus and program storage device for performing a self-healing cache process.

2. Description of the Prior Art

A computer system typically includes a processor coupled to a hierarchical storage system. The hardware can dynamically allocate parts of memory within the hierarchy for addresses deemed most likely to be accessed soon. The type of storage employed in each staging location relative to the processor is normally determined by balancing requirements for speed, capacity, and costs.

Computer processes continually refer to this storage over their executing lifetimes, both reading from and writing to the staged stored system. These references include self-referencing as well as references to every type of other process, overlay or data. It is well-known in the art that data storage devices using high-speed random access memories (RAM) can be referenced orders of magnitude faster than high volume direct-access storage devices (DASD's) using rotating magnetic media. Such electronic RAM storage relies upon high-speed transfer of electrical charges over small distances, while DASD's typically operate mechanically by rotating a data storage position on a magnetic disk with respect to read-write heads. The relative cost of a bit of storage for DASD and RAM makes it necessary to use DASD for bulk storage and electronic RAM for processor internal memory and caching.

A commonly employed memory hierarchy includes a special, high-speed memory known as cache, in addition to the conventional memory which includes main memory and bulk memory. Cache memory may be arranged in a variety of configurations.

For example, in a cache that uses direct mapping, a data item in main memory is always stored at the same location in the cache. Its address is split into three parts: the first is used to address the line that the data can be found in, the second is stored in the tag RAM to uniquely identify the data in the cache, and the third is the offset of the data in the line.

Fully associative caches are configured to allow any line in memory to be stored at any location in the cache. Associative caches use fewer bits to address the cache line than would be necessary to uniquely identify it. Thus data items can map to multiple lines. Most caches are n-way associative caches, meaning most caches can map data to n distinct locations. In order to identify which data is in the cache, more bits have to be used in the tag RAM. Due to the multiple lines in which a data item may be stored, accessing the cache requires a search process. In order to keep the speed of the lookup operation at the level of a direct mapped cache, the search process must be performed in parallel, requiring n comparators for an n-way associative cache. Advantages of implementing an n-way associative cache include, data items that would map to the same line in a direct mapped cache can now be stored in the cache at the same time, trashing is reduced and utilization improved. Cache memory can be dedicated for instructions or for data. Caches can also exist for addresses translation entries and other types of data.

Cache memory speed increases the apparent access times of the slower memories by holding the words that the CPU is most likely to access. For example, a computer may use a cache memory that resides between the external devices and main memory, called a disk cache, or between main memory and the CPU, called a CPU cache.

A high-speed CPU cache enables relatively fast access to a subset of data instructions, which were previously transferred from main storage to the cache, and thus improves the speed of operation of the data processing system. Cache memory may also be used to store recently accessed blocks from secondary storage media such as disks. This cache memory could be processor buffers contained in main memory or a separate disk cache memory located between secondary and main storage.

A disk cache is a memory device using a semiconductor RAM or SRAM and is designed to eliminate an access gap between a high-speed main memory and low-speed large-capacity secondary memories such as magnetic disk units. The disk cache is typically in a magnetic disk controller arranged between the main memory and a magnetic disk unit, and serves as a data buffer.

The principle of a disk cache is the same as that of a central processing unit (CPU) cache. When the CPU accesses data on disk, the necessary blocks are transferred from the disk to the main memory. At the same time, they are written to the disk cache. If the CPU subsequently accesses the same blocks, they are transferred from the disk cache and not from the disk, resulting in substantially faster accesses.

Other levels of cache are available separate from disk cache and CPU cache. For example, L1 cache, from Level 1 cache, is known as the primary cache and is built into a microprocessor. L1 cache is the smallest and fastest cache level. L2 cache, short for Level 2 cache, is a second level of cache that is larger and slower compared to L1 cache. L2 cache, also called the secondary cache, may be found on a separate chip from the microprocessor chip or may be incorporated into a microprocessor chip's architecture. Other layers of cache may also be implemented. Disk cache, in relation to L1 and L2 caches, is much slower and larger. The CPU cache, comparatively speaking, is very slow and very large.

When a request to read from memory can be satisfied from the cache without using the main memory, the cache controller behaves differently depending on the cache type. For a read operation, the controller selects the data from the cache line and transfers it into a CPU register; the RAM is not accessed and the CPU efficiency increases. For a write operation, the controller may implement one of two basic strategies called write-through and write-back. In a write-through operation, the controller always writes into both RAM and the cache line, effectively switching off the cache for write operations. In a write-back or copyback operation, only the cache line is updated, and the contents of the RAM are left unchanged. After a write-back or copyback operation the RAM must eventually be updated. When a cache miss occurs, the cache line is written to memory, if necessary, and the correct line is fetched from RAM into the cache entry.

With performance being very important and semiconductor geometries shrinking, it is becoming common to implement large caches. L2 caches of 512K to 1 MB are becoming ordinary. However, these caches can experience many types of failures, some of them being transient and some permanent. Caches may have built-in failure checks and may use either parity or error correction code (ECC) methods for detecting errors. For example, parity checks require an extra bit for every 8 bits of data and check for memory errors using even parity or odd parity checks. For even parity, when the 8 bits in a byte receive data, the chip adds up the total number of 1s. If the total number of 1s is odd, the parity bit is set to 1. If the total is even, the parity bit is set to 0. When the data is read back out of the bits, the total is added up again and compared to the parity bit. If the total is odd and the parity bit is 1, then the data is assumed to be valid and is sent to the CPU. But if the total is odd and the parity bit is 0, the chip knows that there is an error somewhere in the 8 bits and dumps the data. Odd parity works the same way, but the parity bit is set to 1 when the total number of 1s in the byte is even.

Parity checking can detect all single bit errors and is 50% effective against random corruption. However, parity does nothing to correct them. If a byte of data does not match its parity bit, then the data are discarded and the system must recover. This problem can reduce cache efficiency and performance.

Some memory caches use a form of error checking known as error-correction code (ECC). Like parity, ECC uses additional bits to monitor the data in each byte. The difference is that ECC uses several bits for error checking instead of one. ECC memory uses a special algorithm not only to detect single bit errors, but actually correct them as well. For example, Many memory systems and caches use some type of Hamming code to perform ECC. ECC memory will also detect instances when more than one bit of data in a word fails. Such failures are not correctable, even with ECC and software is left with little choice but to reset and start over and determine if the problem reoccurs. When permanent errors are present in any type of cache, the same error is repeatedly detected resulting in decreased cache efficiency and performance.

Recovery from uncorrectable errors may involve a lengthy process of resetting and reloading all the code to the computer system. During this time, the customer may not be able to perform useful work, or if it is a redundant system, there exists the increased risk that a code bug during the recovery process could bring down the entire system. Error recovery code is very difficult to test and does tend to have higher error rates than code that is executed more frequently.

It can be seen that there is a need for a method, apparatus and program storage device for increasing cache performance, efficiency and recoverability.

SUMMARY OF THE INVENTION

To overcome the limitations in the prior art described above, and to overcome other limitations that will become apparent upon reading and understanding the present specification, the present invention discloses a method, apparatus and program storage device for performing a self-healing cache process.

Embodiments of the present invention solve the above-mentioned problems by monitoring a cache for errors and performing a self-healing process in response to the type of error.

A program storage device readable by a computer, where the program storage device tangibly embodies one or more programs of instructions executable by the computer to perform a self-healing cache process is provided. The process includes detecting at least one error affecting a cache having a matching address tag for a fetching operation, determining a type of the at least one error affecting the cache, and performing a self-healing cache process based on the determined type of the at least one error.

In another example embodiment of the invention, an apparatus for performing a self-healing cache process is provided. The apparatus having a multi-level cache, and a processor, coupled to the multi-level cache, the processor configured for detecting at least one error affecting a cache having a matching address tag for a fetching operation, determining a type of the at least one error affecting the cache and performing a self-healing cache process based on the determined type of the at least one error.

In yet another example embodiment of the invention, an apparatus for performing a self-healing cache process is provided. The apparatus having means for storing data, and means, coupled to the means for storing data, for detecting at least one error affecting means for storing data having a matching address tag for a fetching operation, determining a type of the at least one error affecting the means for storing data and performing a self-healing cache process based on the determined type of the at least one error.

In another example embodiment of the present invention, a method for performing a self-healing cache process is provided. The method including detecting at least one error affecting a cache having a matching address tag for a data fetching operation, determining a type of the at least one error affecting the cache, and performing a self-healing cache process based on the determined type of the at least one error.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

This invention provides a mechanism for a self-healing cache process for instruction only caches, data only caches, mixed caches, and caches which are writethrough and copyback. The invention also provides a mechanism for recovering from tag RAM errors.

A cache set is defined as a group of n entries, where n corresponds to an n-way set associativity. An entry is defined as one cache line within an undefined set of n entries. A way is defined as including an entry (cache line) an address tag, state flags which denote whether it is invalid, modified, exclusive, etc. A way may also include least recently used (LRU) flags that define the order the entry is to be cast out.

In one aspect of the invention a new flag per way called the deallocate flag is defined. An array of deallocate flags can be loaded from non-volatile memory. The deallocate flag has the same logical meaning as invalid except that it cannot be allocated. A deallocated way is skipped when determining which way gets the next entry. For example, for an 8-way set associative cache, having a 32 byte cache line and 128 cache sets has 128*8*32=32K bytes. If a processor wants to fetch an instruction from address 0x0030 1800, the index is found by taking bits A20 through A26 (big Endian), which is 0b100 0000 (0d64). Therefore, the cache controller looks at the tags for cache set 64. For an 8-way cache, the controller will examine all 8 ways simultaneously to see if any are valid and have a matching address tag. If, for example, way 3 has a matching tag, this is a hit. The controller then reads the cache line from way 3, but finds a parity check or ECC check. The deallocate flag will get set and this will cause the way to be looked at as though it were invalid. The difference between the invalid flag and the deallocate flag is that the deallocate flag cannot be set valid unless and until code explicitly turns off the deallocate bit. In an embodiment of the present invention, the deallocate flag may include an error counter to determine when the flag should be set.

Figure 1:
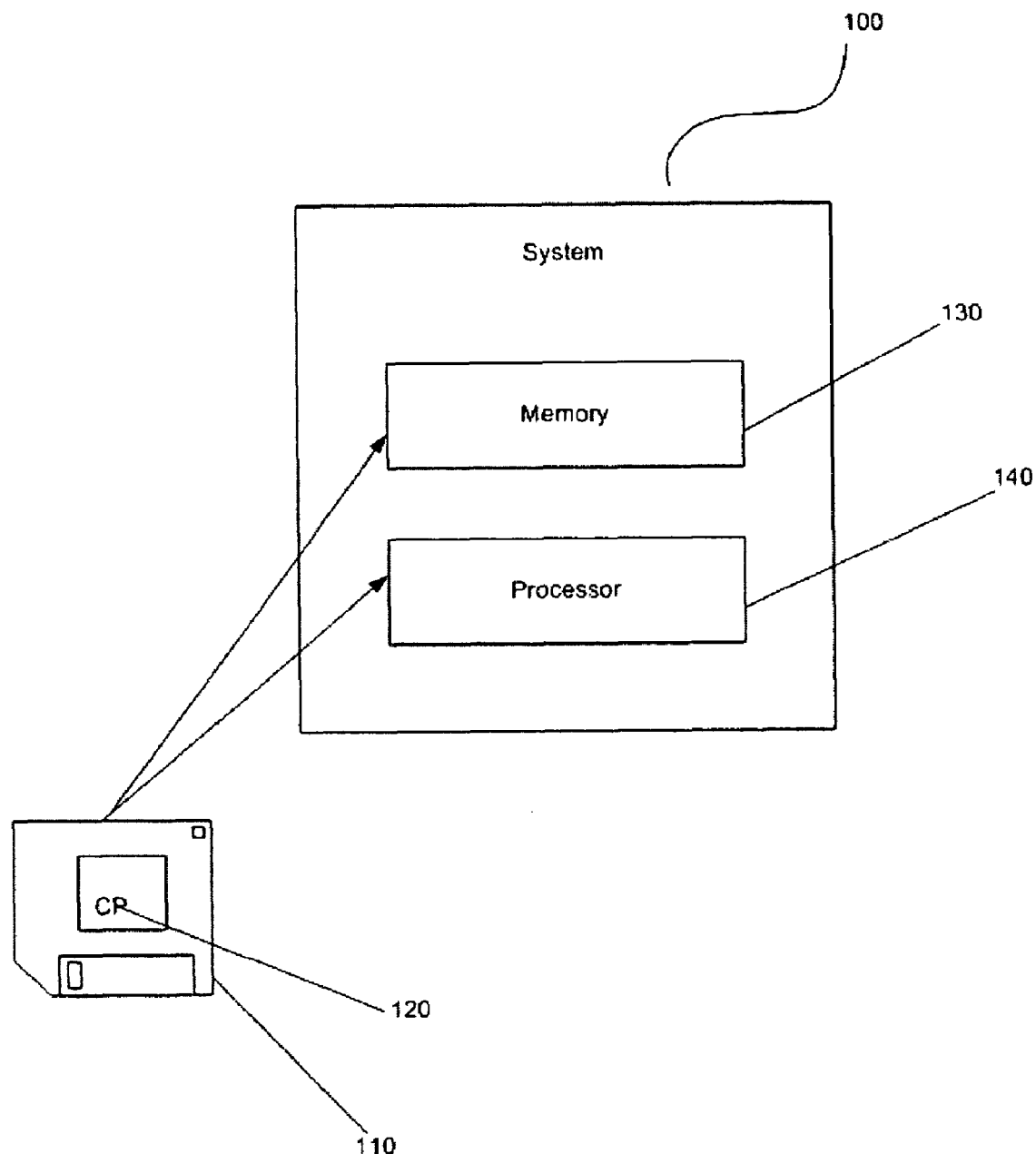
FIG. 1 illustrates a system according to the present invention.

FIG. 1 illustrates a system 100 according to the present invention, wherein the processes illustrated in FIGS. 2-9 may be tangibly embodied in a computer-readable storage medium; e.g. one or more of the fixed and/or removable data storage devices 110 or other data storage devices. A computer program 120 expressing the processes embodied on the removable data storage devices 110 may be loaded into the memory 130 or into the system 100, e.g., in a processor 140, to configure the system 100 of FIG. 1 for execution. The computer program 120 comprise instructions which, when read and executed by the system 100 of FIG. 1, causes the system 100 to perform the steps necessary to execute the steps or elements of the present invention.

Memory hierarchies allow for cache recovery operations because information contained in a cache level, for example cache level L1, is also stored in the next lower memory level in the memory hierarchy, for example cache level L2. As will be described in further detail in FIGS. 2, 3 and 4, information from a lower cache level corresponding to corrupted information from a higher memory level can be fetched, and may be written to the higher memory level, thereby performing a self-healing cache process.

Figure 2:
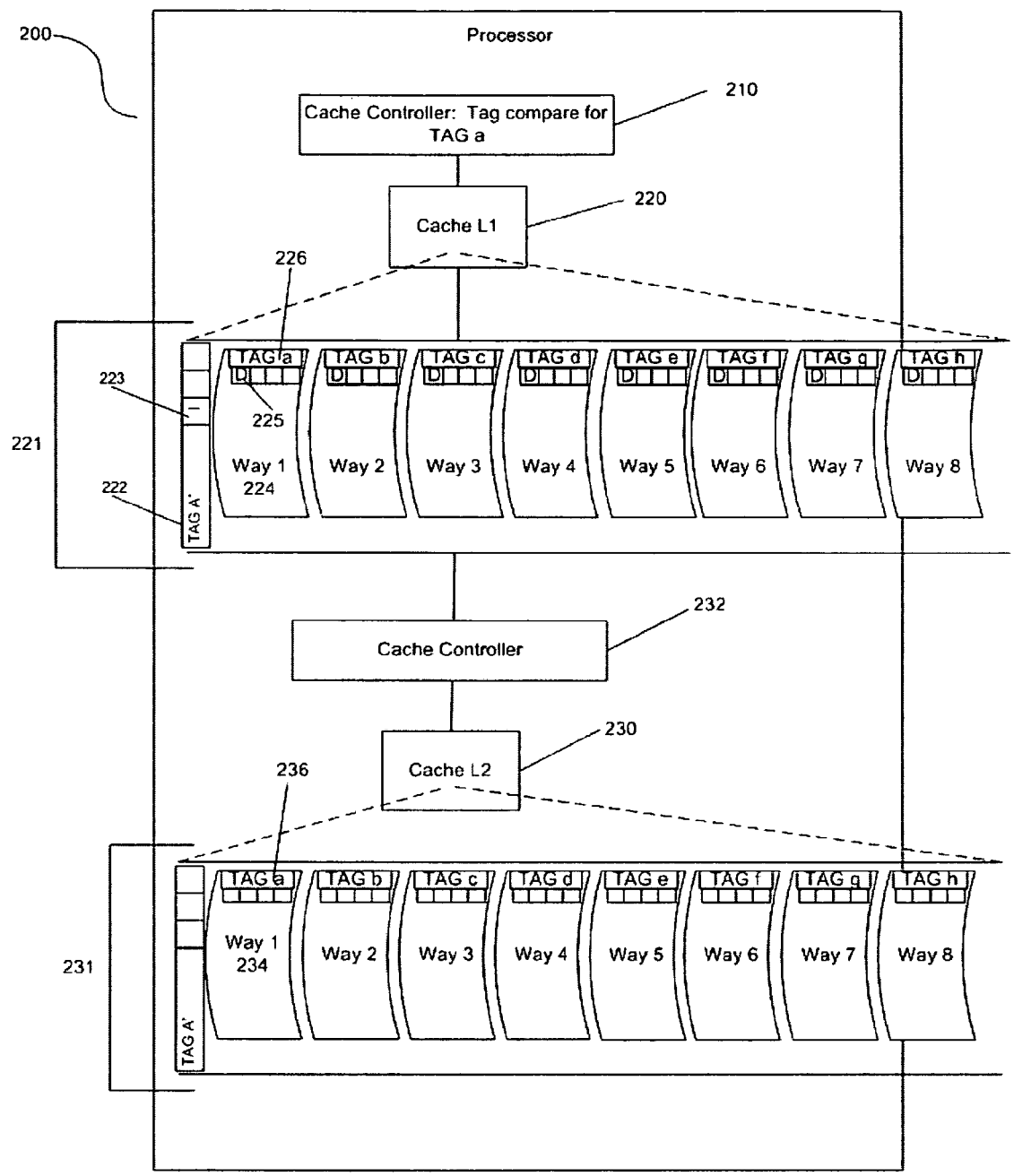
FIG. 2 is a diagram of a processor performing a tag compare in accordance with an embodiment of the present invention.

FIG. 2 is a diagram of a processor 200 having cache controllers 210, 232 performing a tag compare in accordance with an embodiment of the present invention. Cache controller 210 first identifies address tag A 222 for cache set 221. Cache set 221 has been marked invalid 223 because errors affecting the entire cache set are present. Here errors affect the entire cache because each way is marked with a deallocate flag. Deallocate flag 225 can be found in way 1 224 and each way in cache set 221 has the deallocate flag set the in the same manner. When the cache set is invalid, cache controller 232 looks to locate a match for tag "a" in cache L2 230 of cache set 231. In cache L2 230 tag a 236 is found in way 1 234. No deallocate flag is present in way 1 234 so cache controller proceeds with the address request and fetches the cache line from way 1 234.

Figure 3:
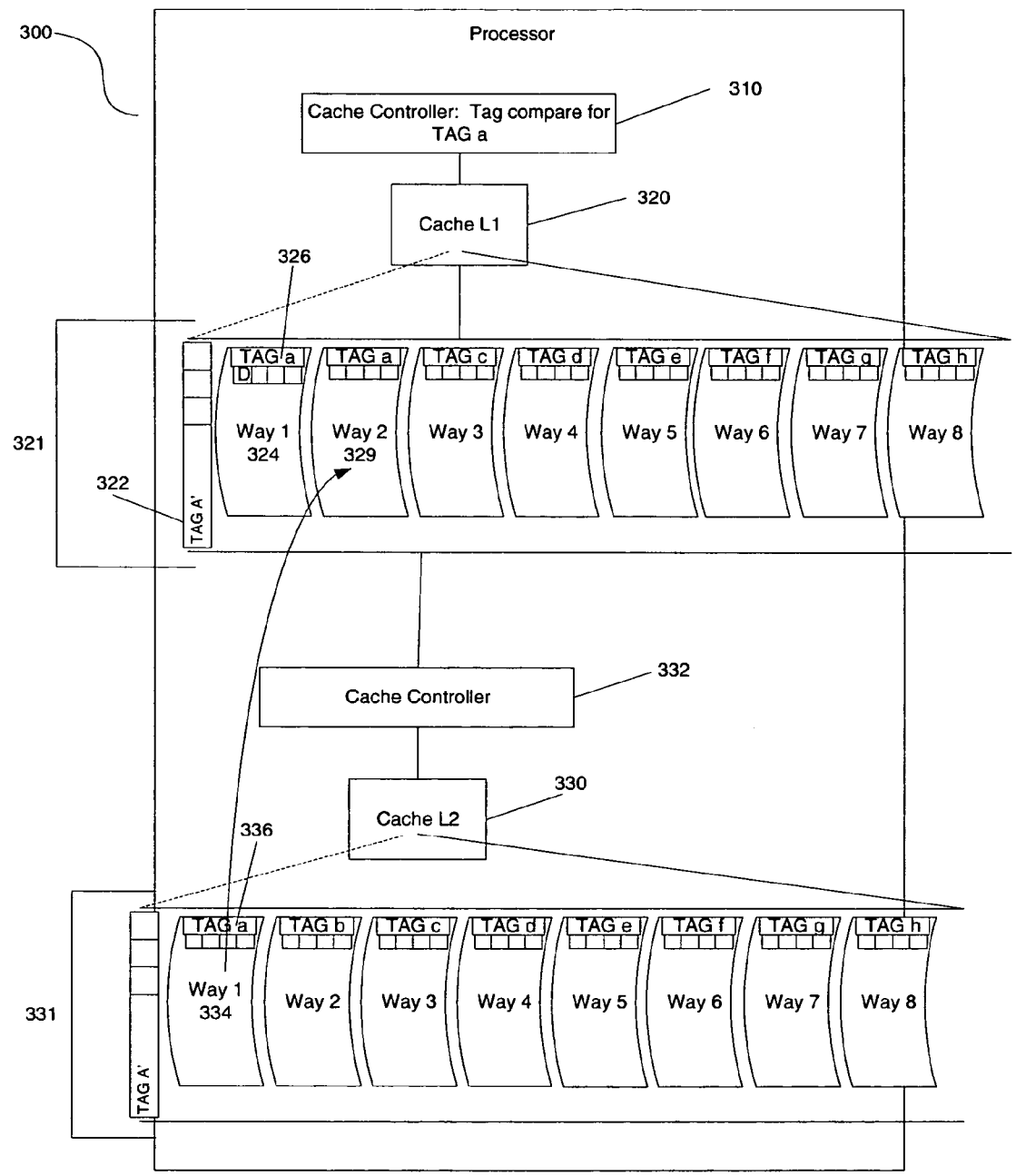
FIG. 3 is a diagram of a processor performing a cache line allocation in accordance with an embodiment of the present invention.

FIG. 3 is a diagram of a processor 300 having cache controllers 310, 332 performing a tag compare in accordance with an embodiment of the present invention. Address tag A 322 is provided for cache set 321. When a cache set is not marked invalid or marked deallocated, cache controller 310 simultaneously compares address tags for an 8-way cache set 321 in cache L1 320. If the deallocate flag is present in way 1, then the cache controller 310 will not compare the contents of the tag with the lookup value. It is treated as Invalid and contents are ignored.

In this example, the deallocate flag 325 is present the cache line in way 1 324 and the controller 310 treats way 1 as being invalid and the content is ignored. Cache controller 332 locates the corresponding cache line in the next lower memory level, cache L2 330. In cache L2 330, the corresponding cache line in way 1 334 of cache set 331 is identified by its matching tag a 336. The deallocate flag is not present and thus the cache line in way 1 332 in cache set 331 is not viewed as invalid. The cache line from matching way 1 334 in L2 330 is allocated to a next way in cache set 321, for example to way 2 329 in cache set 321 in cache L1. Alternatively, when a next way in cache set 321 is not available, then a way is cleared and the cache line is allocated to the cleared way. When the deallocate flag has been set for a way, a controller may choose which way to write the cache line to, excluding the way having the deallocate flag. For example, the way written to in cache set 321 may be chosen by determining which way has a least recently used (LRU) flag (not shown). Thus, the oldest data is replaced in the cache set by the rewritten cache line and the deallocated way will not cause any future errors to the cache controller.

Figure 4:
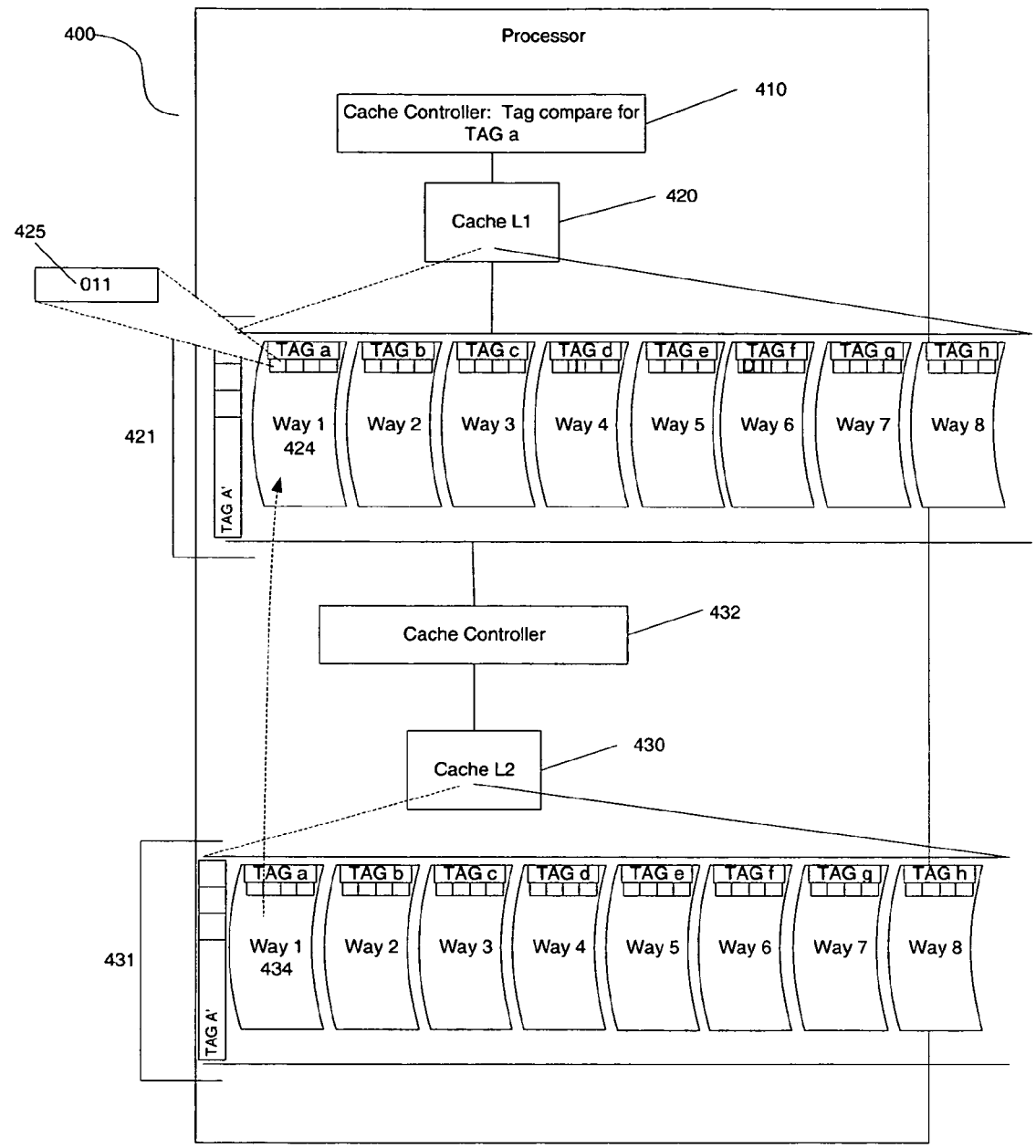
FIG. 4 is a diagram of a processor performing a cache line rewrite in accordance with an embodiment of the present invention.

Turning to FIG. 4, a diagram of a processor performing a cache line rewrite in accordance with an embodiment of the present invention is illustrated. FIG. 4 shows a cache system 400 using a deallocate flag counter 425, where the counter is a 3-bit counter. In way 1 424 of cache set 421, deallocate flag counter 425 shows a count of 6 (binary 0110). The counter 425 is incremented when an error is detected. In other words, if the cache is instruction or it is data and the dirty flag is not on, then controller 410 can simply increment the counter 425 and can then fetch the data from somewhere else in the hierarchy. If the cache is data and the dirty flag is on then that means that the data had not been written out and is unrecoverable. In this instance, error recovery software will have to be invoked to determine how to handle the data. Nevertheless, the counter should be incremented.

When the deallocate flag counter reaches 7 (binary 0111), the threshold has been met as the bits in the deallocate flag counter show 0111, and the way is deallocated. In FIG. 4, however, deallocate flag counter 425 has not reached its threshold and data corresponding to the data contained in way 1 424 is fetched and allocated to way 1 424. Cache controller 410 retrieves data from a next cache level L2 430 via cache controller 432 and allocates the corresponding cache line found in cache set 431, way 1 434 to way 1 424 in cache level L1 420 having the deallocate counter set at 6.

When deallocate flag counter 425 has reached the predetermined threshold, cache controller 410 views the way as invalid. The self-healing cache process described in FIG. 3 is then followed.

Figure 5:
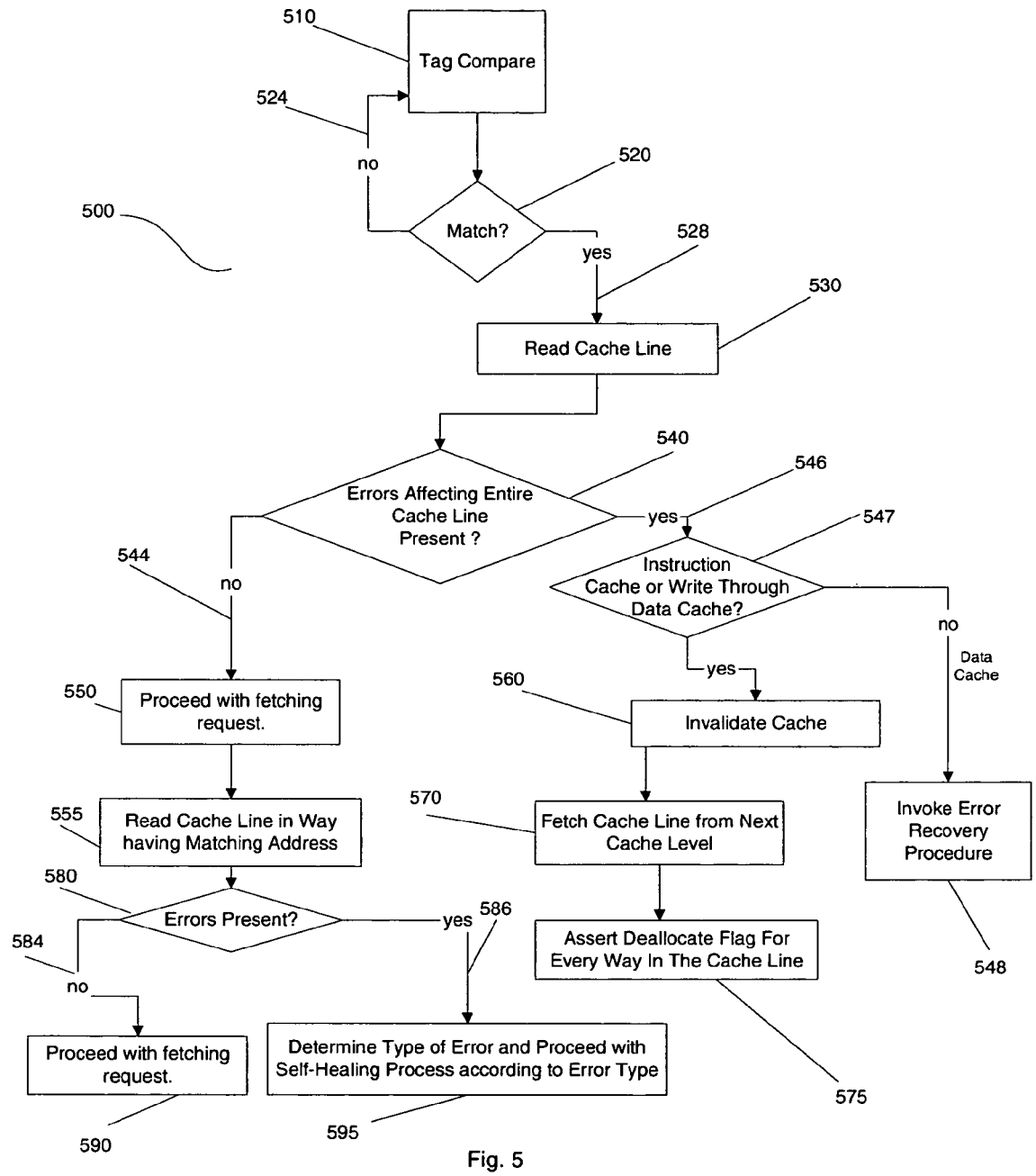
FIG. 5 is a flow chart depicting a self-healing cache process in accordance with an embodiment of the present invention.

FIG. 5 is a flow chart depicting a self-healing cache process 500 in accordance with an embodiment of the present invention. In general, searching an instruction, data or copyback cache for an address matching the address request is starts with a tag compare 510. Tag compares are performed for the cache set and then for ways in the cache set. In this example, the address tag for the cache set is compared to the address requested to identify 520 a matching address tag. If a match is not present 524 then searching continues and the tag compare 510 portion of the process cycles until a match is found 528. When the matching address tag is present 528, the cache line for the cache set is read 530 and a determination is made about whether errors affecting the entire cache set are present 540. Errors affecting an entire cache set may, for example, mean that each way in the cache set is deallocated. If yes 546, a determination is made whether the cache is an instruction cache or for write through data cache 547. For instruction caches or for write through data caches, then the cache set is invalidated 560. The cache controller then fetches the address requested from a next cache level 570. The deallocate flag will be asserted for every way in the cache set 575. From now on, indexes matching the deallocated cache set will no longer be cached. That may decrease the hit ratio of the overall cache somewhat. However, this is almost always better than having to repair the part containing the cache. The deallocate flag is set when an uncorrectable error is detected.

If this is a data cache, it is possible that the dirty flag was on for one or more of the cache sets, and error recovery will have to be invoked 548 since data may have been lost. A dirty flag means that the processor wrote data to the cache, but the cache line had not yet been flushed to the next level in the hierarchy.

When errors affecting the entire cache are not present 544 then the fetching process 550 continues and a search for the matching address tag is performed simultaneously for each way in the cache set. The cache line in the way having the matching address is fetched and read 555. A determination 580 is made about whether errors are present in the way having the matching address. When no errors in the way are detected 584, the fetching request proceeds 590. When errors are detected 586, the type of error is determined and a self-healing cache process is initiated according to error type 595.

Figure 6:
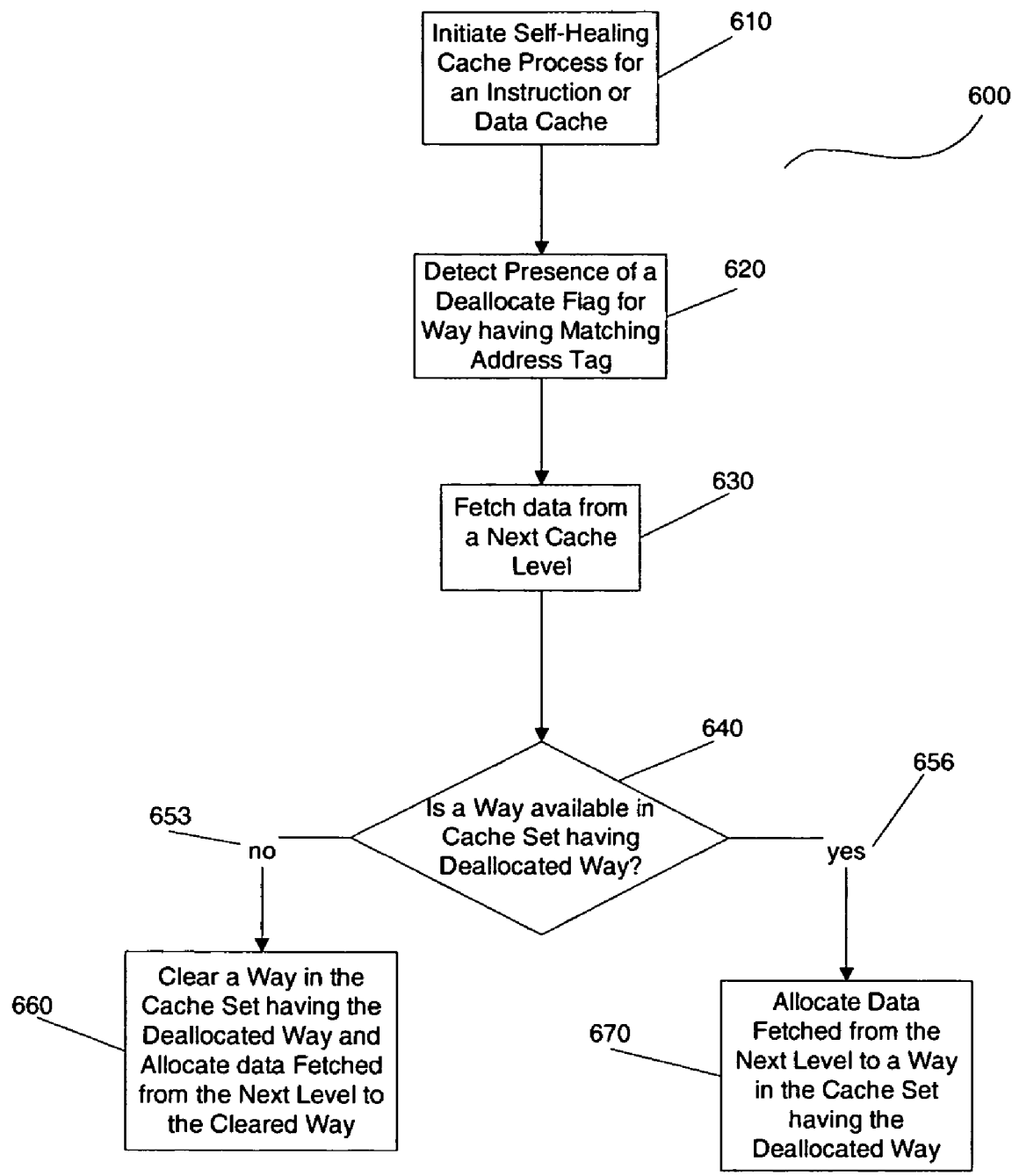
FIG. 6 is a flow chart depicting a self-healing cache process for an instruction or data cache having deallocate flags set in accordance with an embodiment of the present invention.

FIG. 6 is a flow chart depicting a self-healing cache process 600 for an instruction or data cache having deallocate flags set in accordance with an embodiment of the present invention. When an error affecting an instruction or data cache is detected, a self-healing cache process is initiated 610 for an instruction or data cache. The presence of a deallocate flag is detected 620 for the way having the matching address tag. Data corresponding to the way having the deallocate flag set is fetched 630 from a next cache level. For example, data may be fetched from a way in cache level L2 that corresponds to a deallocated way in cache level L1. A determination 640 is made about whether a way is available 640 in the cache set having the deallocated way. When a way is not available 653, then a way is cleared in the cache set having the deallocated way and the data fetched from the next level is allocated 660 to the cleared way. If a way in the cache set having the deallocated way is available 656, then the fetched data is allocated 670 to the available way.

Figure 7:
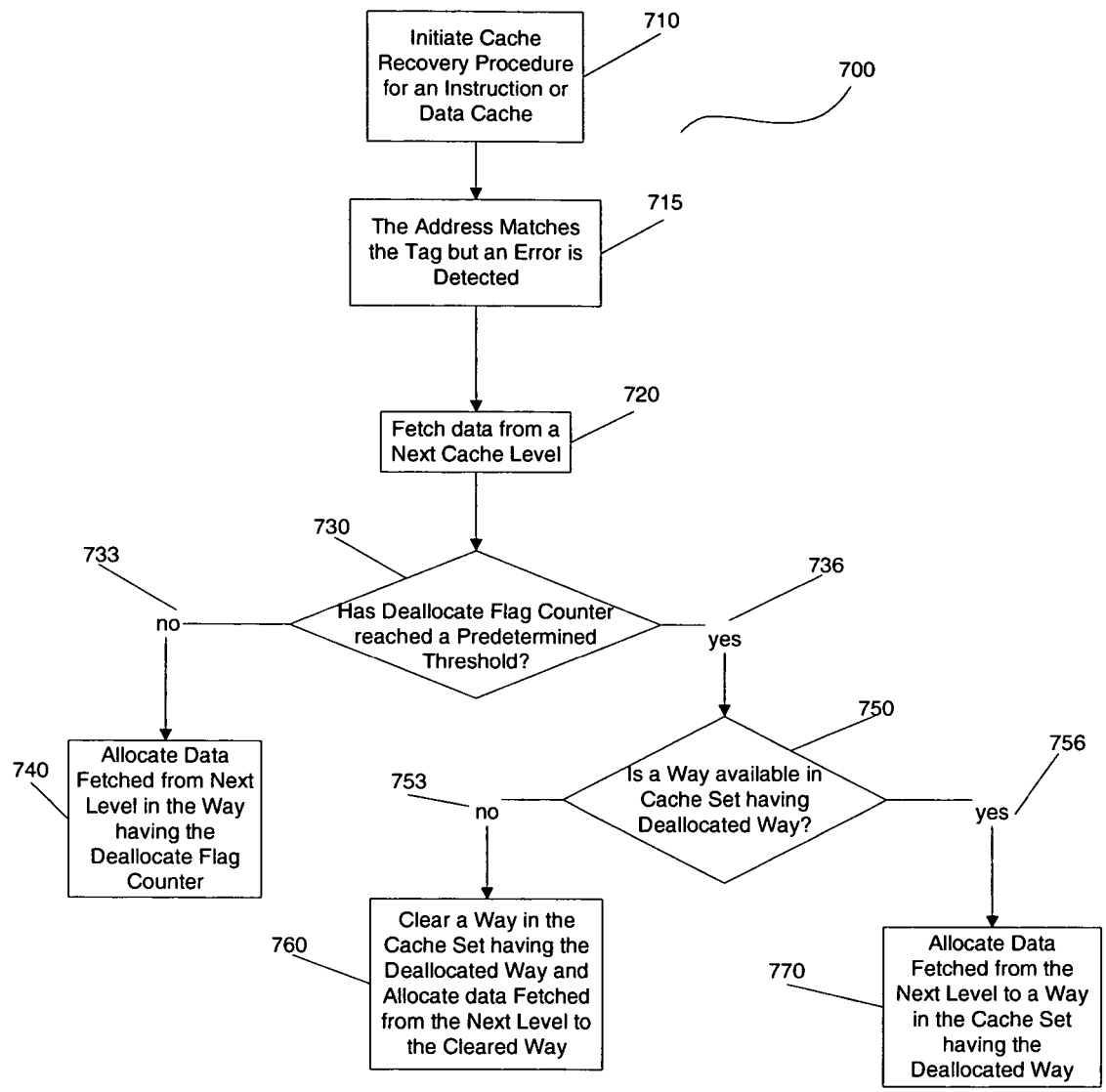
FIG. 7 is a flow chart depicting a self-healing cache process for an instruction or data cache having deallocate counter flags in accordance with an embodiment of the present invention.

FIG. 7 is a flow chart depicting a self-healing cache process 700 for an instruction or data cache having deallocate flag counters in accordance with an embodiment of the present invention. The process described in FIG. 6 is similar to FIG. 7 except a deallocate flag counter is present rather than a deallocate flag. When the self-healing cache process is initiated 710 for an instruction or data cache, incrementing of a deallocate flag counter is detected 715 for the way having the matching address tag. Data is fetched 720 from a next cache level. A determination is made as to whether the deallocate flag counter has reached a predetermined threshold 730. Determining whether the deallocate flag has reached a predetermined threshold may be done using a counter (see FIG. 4), such that the counter detects whether a predetermined number of errors satisfying the predetermined threshold has or has not been reached. Alternatively, the deallocate flag predetermined threshold may be reached by determining whether an uncorrectable error has occurred. When the deallocate flag has reached a predetermined threshold 736, the deallocated way can no longer be written to. A determination is then made about whether a way is available 750 in the cache set having the deallocated way. If a way is available 756 in the cache set having the deallocated way, then the fetched data is allocated 770 to the available way. When a way is not available 753, then a way is cleared in the cache set having the deallocated way and the data fetched from the next level is allocated 760 to the cleared way.

Because the process of FIG. 7 includes the deallocate flag counter, another type of self-healing process can be performed. When the deallocate flag has not reached a predetermined threshold 733 the way is not deallocated. Thus, the fetched data from the next cache level is allocated 740 to the way having the deallocate flag counter set to a number lower than the predetermined threshold. Rather than having a deallocated way and another way having correct data corresponding to the data in the deallocated way, a way having a counter that has not reached the predetermined threshold can have data allocated to it.

Figure 8:
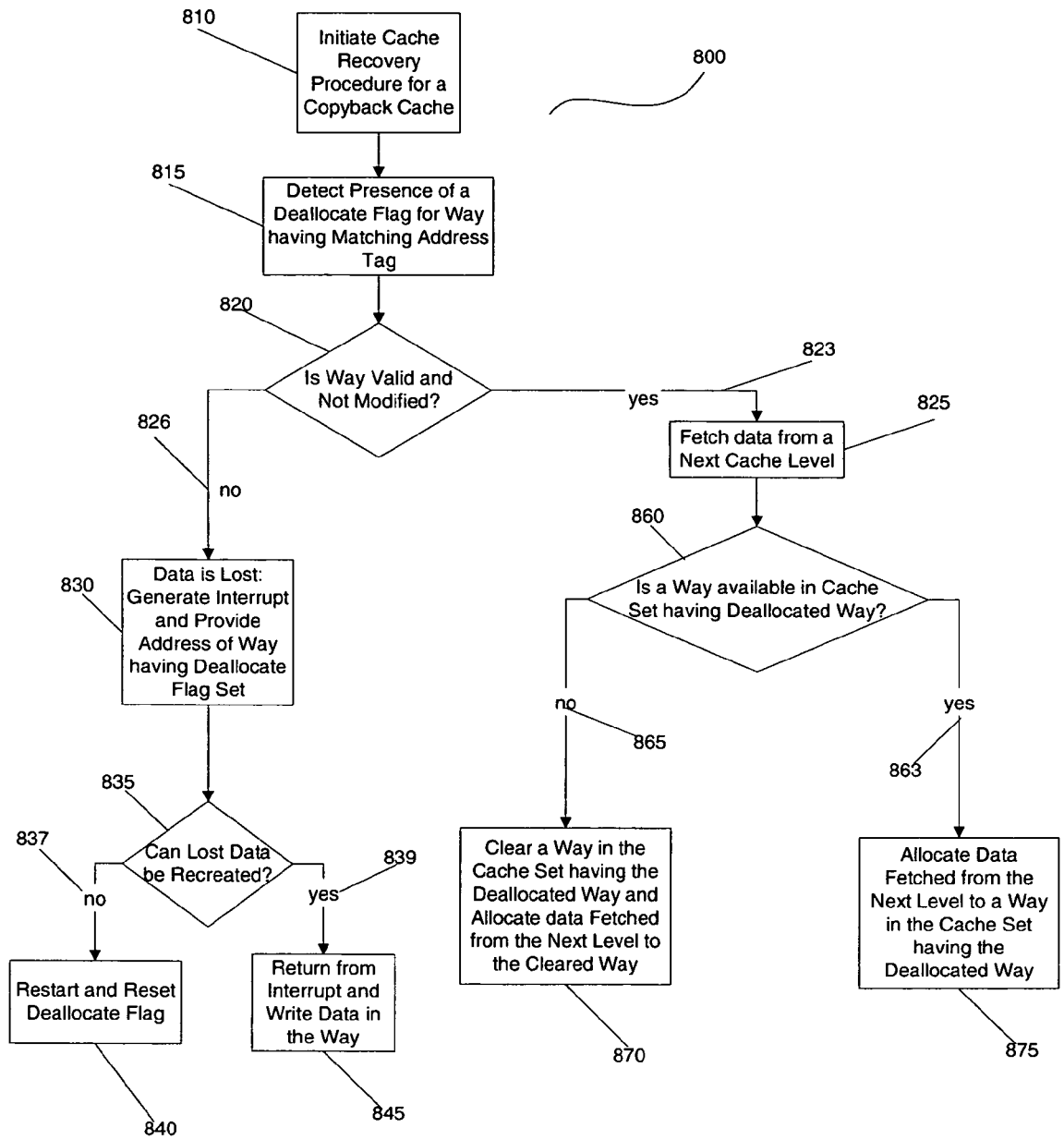
FIG. 8 is a flow chart depicting a self-healing cache process for a copyback cache having deallocate flags in accordance with an embodiment of the present invention.

FIG. 8 is a flow chart depicting a self-healing cache process 800 for a copyback cache having deallocate flags in accordance with an embodiment of the present invention. When the self-healing cache process is initiated 810 for a copyback cache, the address matches the tag but an error is detected 815.

A determination is made about whether the deallocated way is valid and modified 820. If the way is valid and not modified 823, then data is fetched from a next cache level 825. The availability of a way 860 in the cache set having the deallocated way is determined. When a way is available 863, the data fetched from the next level is allocated 875 in the cache set having the deallocated way. When a way is not available 865, a way is cleared in the cache set having the deallocated way and the fetched data from the next level is allocated 870 to the cleared way.

When the way is valid but modified 826, data is lost, an interrupt is generated and an address provided 830 for the way having the deallocated flag set. A determination is made about whether the lost data is capable of being recreated 835. If the data cannot be recreated 837, then a restart occurs and the deallocate flag is reset 840. If the data can be recreated 839, then a return from the interrupt occurs and data is written in the deallocated way 845.

Figure 9:
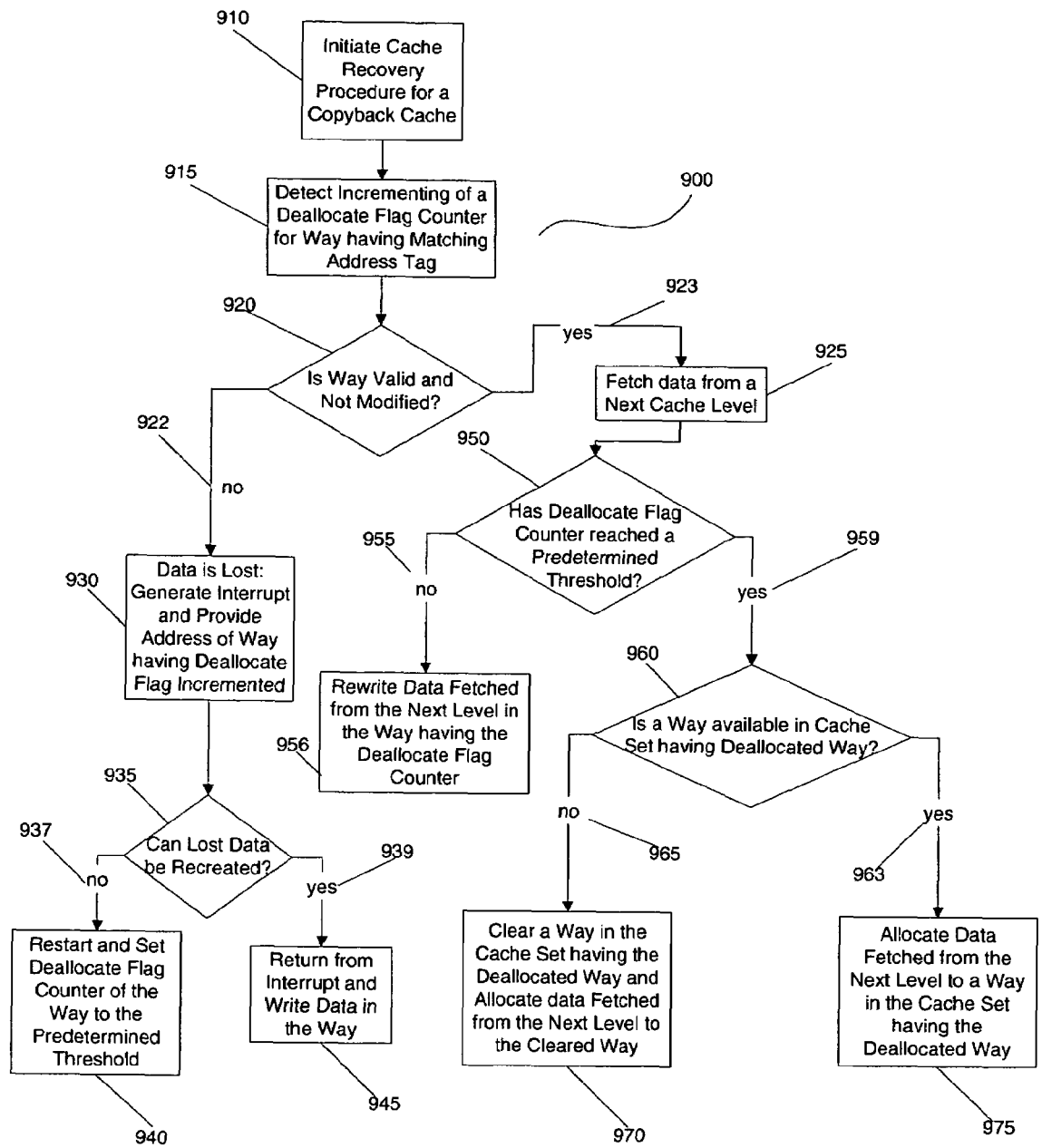
FIG. 9 is a flow chart depicting a self-healing cache process for a copyback cache having deallocate counter flags in accordance with an embodiment of the present invention.

FIG. 9 is a flow chart 900 depicting a self-healing cache process for a copyback cache having deallocate counter flags in accordance with an embodiment of the present invention. The process described in FIG. 8 is similar to FIG. 9 except a deallocate flag counter is present rather than a deallocate flag. When the self-healing cache process is initiated 910 for a copyback cache, incrementing of a deallocate flag counter is detected 915 for the way having the matching address tag. A determination is made about whether the deallocated way is valid and modified 920. If the way is valid and not modified 923, then data is fetched from a next cache level 925. Data is treated differently according to whether the deallocate flag counter has reached a predetermined threshold 950. When the predetermined threshold has not been met 955, the fetched data from the next cache level is rewritten to the way with the deallocate flag counter 956. When the deallocate flag counter has reached a predetermined threshold 959, data is treated the same as if a deallocate flag were set for the way. Therefore, the availability of a way 960 in the cache set having the deallocated way is determined. When a way is available 963, the data fetched from the next level is allocated 975 in the cache set having the deallocated way. When a way is not available 965, a way is cleared in the cache set having the deallocated way and the fetched data from the next level is allocated 970 to the cleared way.

When a way for copyback cache having a matching address tag is valid and modified 922, data is lost. An interrupt is generated and the address of the way having the deallocate flag incremented is provided 930. A determination is made as to whether the lost data can be recreated 935. When the data can be recreated 939, the process returns from the interrupt and writes the data in the way having the deallocate flag incremented 945. When the lost data cannot be recreated 937, the process is restarted and the deallocate flag counter is set to the predetermined threshold 940 so that the error cannot occur again.

The foregoing description of the exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A program storage device readable by a computer, the program storage device tangibly embodying one or more programs of instructions executable by the computer to perform a self-healing cache process comprising:
   detecting at least one error affecting a cache having a matching address tag for a fetching operation;
   determining a type of the at least one error affecting the cache; and
   performing a self-healing cache process based on the determined type of the at least one error, wherein performing a self-healing cache process based on the determined type of the at least one error further comprises setting a deallocate flag for a way having an address matching the address associated with the fetch operation, and wherein performing a self-healing cache process based on the determined type of the at least one error further comprises, when the determined type of the at least one error is one of an instruction cache type, a data cache type, or an unmodified copyback type, fetching data from a next level of cache and allocating data fetched from the next level to a different way in the cache set when the different way is available, else clearing a way in the cache and allocating data fetched from the next level to the cleared way in the cache set when a different way is not available.

2. The program storage device of claim 1, wherein detecting at least one error affecting a cache comprises detecting at least one error affecting an entire cache line.

3. The program storage device of claim 2, wherein detecting at least one error affecting the entire cache set further comprises setting a deallocate flag for each way when an error is detected.

4. The program storage device of claim 3 further comprising invalidating the cache set when each way has the deallocate flag set.

5. The program storage device of claim 3, wherein determining a type of the at least one error affecting the entire cache set comprises determining the errors affecting the cache are parity errors.

6. The program storage device of claim 2, wherein performing a self-healing cache process based on the determined type of the at least one error comprises, when the determined type of the at least one error is an instruction or copyback cache error, invalidating the entire cache set, continuing with the fetching operation and asserting a deallocate flag for every way in the cache set.

7. The program storage device of claim 2, wherein performing a self-healing cache process based on the determined type of the at least one error comprises, when the determined type of the at least one error is a data cache error, invoking an error recovery procedure.

8. A program storage device readable by a computer, the program storage device tangibly embodying one or more programs of instructions executable by the computer to perform a self-healing cache process comprising:
   detecting at least one error affecting a cache having a matching address tag for a fetching operation;
   determining a type of the at least one error affecting the cache; and
   performing a self-healing cache process based on the determined type of the at least one error, wherein performing a self-healing cache process based on the determined type of the at least one error further comprises setting a deallocate flag for a way having an address matching the address associated with the fetch operation, and wherein performing a self-healing cache process based on the determined type of the at least one error further comprises when the determined type of the at least one error is a modified copyback type, generating an interrupt and providing the address for each way having a deallocate flag set, and when the interrupt is generated, recreating the data when data in the way having the deallocate flag set is capable of being recreated, returning from the interrupt and writing the recreated data in the way having the deallocated flag set when the data in the way having the deallocated flag set is capable of being recreated.

9. The program storage device of claim 8, further comprising restarting and resetting the deallocate flag of the way when the data in the way having the deallocated flag set is not capable of being recreated.

10. A program storage device readable by a computer, the program storage device tangibly embodying one or more programs of instructions executable by the computer to perform a self-healing cache process comprising:
   detecting at least one error affecting a cache having a matching address tag for a fetching operation;
   determining a type of the at least one error affecting the cache; and
   performing a self-healing cache process based on the determined type of the at least one error, wherein performing a self-healing cache process based on the determined type of the at least one error further comprises setting a deallocate flag for a way having an address matching the address associated with the fetch operation, and wherein the deallocate flag is a counter and setting the deallocate flag comprises incrementing the counter and wherein performing a self-healing cache process based on the determined type of the at least one error further comprises, when the determined type of the at least one error is one of an instruction cache type, a data cache type, or an unmodified copyback type, determining a value of the counter and when the value of the counter is less than a predetermined threshold fetching data from a next level of cache and allocating data fetched from the next level to the way having the counter of the deallocate flag incremented.

11. The program storage device of claim 10, wherein when the value of the counter is not less than a predetermined threshold fetching data from a next level of cache and allocating data fetched from the next level to a different way in the cache set when the different way is available, else clearing a way in the cache and allocating data fetched from the next level to the cleared way in the cache set when a different way is not available.

12. The program storage device of claim 11, wherein the way is viewed as invalid when the value of the counter of the deallocate flag is equal to the predetermined threshold.

13. The program storage device of claim 10, wherein performing a self-healing cache process based on the determined type of the at least one error further comprises, when the determined type of the at least one error is a modified copyback type, generating an interrupt and providing the address for each way having a deallocate flag set.

14. The program storage device of claim 13, further comprising, when the interrupt is generated, recreating the data when data in the way having the deallocate flag counter incremented is capable of being recreated, returning from the interrupt and writing the recreated data in the way having the deallocated flag counter incremented when the data in the way having the deallocated flag counter incremented is capable of being recreated.

15. The program storage device of claim 14, further comprising restarting and setting the deallocate flag counter to the predetermined threshold when the data in the way having the deallocated flag counter incremented is not capable of being recreated.

16. An apparatus for performing a self-healing cache process comprising:
a multi-level cache; and
a processor, coupled to the multi-level cache, the processor configured for detecting at least one error affecting a cache having a matching address tag for a fetching operation, determining a type of the at least one error affecting the cache and performing a self-healing cache process based on the determined type of the at least one error, wherein the processor sets a deallocate flag for a way having an address matching the address associated with the fetch operation, and wherein the processor, when the determined type of the at least one error is one of an instruction cache type, a data cache type, or an unmodified copyback type, fetches data from a next level of cache and allocates data fetched from the next level to a different way in the cache set when the different way is available, else clearing a way in the cache and allocating data fetched from the next level to the cleared way in the cache set when a different way is not available.

17. The apparatus of claim 16, wherein the processor determines that the at least one error affects an entire cache line.

18. The apparatus of claim 17, wherein the processor sets the deallocate flag for each way when an error is detected for a way.

19. The apparatus of claim 18, wherein the processor invalidates the cache set when each way has the deallocate flag set.

20. The apparatus of claim 18, wherein the errors affecting the cache are parity errors.

21. The apparatus of claim 17, wherein the processor invalidates the entire cache line, continues with the fetching operation, and asserts a deallocate flag for every way in the cache line when the error type is of the instruction cache, data cache or unmodified copyback cache error type.

22. The apparatus of claim 17, wherein the processor invokes an error recovery procedure when the error type is of modified copyback cache error type.

23. An apparatus for performing a self-healing cache process comprising:
a multi-level cache; and
a processor, coupled to the multi-level cache, the processor configured for detecting at least one error affecting a cache having a matching address tag for a fetching operation, determining a type of the at least one error affecting the cache and performing a self-healing cache process based on the determined type of the at least one error, wherein the processor sets a deallocate flag for a way having an address matching the address associated with the fetch operation, wherein the processor, when the determined type of the at least one error is a modified copyback type, generates an interrupt and provides the address for each way having a deallocate flag set, and wherein, after the interrupt is generated, the processor recreates the data when data in the way having the deallocate flag set is capable of being recreated, returns from the interrupt and writes the recreated data in the way having the deallocated flag set when the data in the way having the deallocated flag set is capable of being recreated.

24. The apparatus of claim 23, wherein the processor restarts the cache and resets the deallocate flag of the way when the data in the way having the deallocated flag set is not capable of being recreated.

25. An apparatus for performing a self-healing cache process comprising:
a multi-level cache; and
a processor, coupled to the multi-level cache, the processor configured for detecting at least one error affecting a cache having a matching address tag for a fetching operation, determining a type of the at least one error affecting the cache and performing a self-healing cache process based on the determined type of the at least one error, wherein the processor sets a deallocate flag for a way having an address matching the address associated with the fetch operation and wherein the processor, when the determined type of the at least one error is one of an instruction cache type, a data cache type, or an unmodified copyback type, increments a counter for a deallocate flag of a way having an address matching the address associated with the fetch operation, determines a value of the counter and when the value of the counter is less than a predetermined threshold fetches data from a next level of cache and allocates data fetched from the next level to the way having the counter of the deallocate flag incremented.

26. The apparatus of claim 25, wherein when the value of the counter is not less than a predetermined threshold fetches data from a next level of cache and allocates data fetched from the next level to a different way in the cache set when the different way is available, else clears a way in the cache and allocates data fetched from the next level to the cleared way in the cache set when a different way is not available.

27. The apparatus of claim 25, wherein the processor considers the way invalid when the value of the counter of the deallocate flag is equal to the predetermined threshold.

28. The apparatus of claim 25, wherein the processor, when the determined type of the at least one error is modified copyback type, generates an interrupt and provides the address for each way having the deallocate flag counter incremented.

29. The apparatus of claim 28, further comprising, when the processor generates an interrupt, the processor recreates the data when data in the way having the deallocate flag counter incremented is capable of being recreated, returns from the interrupt and writes the recreated data in the way having the deallocated flag counter incremented when the data in the way having the deallocated flag counter incremented is capable of being recreated.

30. The apparatus of claim 29, further comprising, the processor restarts and sets the deallocate flag counter to the predetermined threshold when the data in the way having the deallocated flag counter incremented is not capable of being recreated.

* * * * *